United States Patent
Gourdine

(12) 
(10) Patent No.: US 6,936,969 B2
(45) Date of Patent: Aug. 30, 2005

(54) SECONDARY VEHICLE HEADLIGHT SYSTEM

(76) Inventor: Roger K. Gourdine, 1137 Murrell Block Dr., Pineville, SC (US) 29468

( * ) Notice: Subject to any disclaimer, the term of this patent is extended or adjusted under 35 U.S.C. 154(b) by 0 days.

(21) Appl. No.: 10/108,786

(22) Filed: Mar. 28, 2002

(65) Prior Publication Data

US 2003/0184233 A1 Oct. 2, 2003

(51) Int. Cl.$^7$ ................................................ B60Q 1/02
(52) U.S. Cl. .............................. 315/82; 315/77; 315/83
(58) Field of Search .............................. 315/82, 77, 76, 315/83, 80; 340/468, 471, 475, 458, 641, 642

(56) References Cited

U.S. PATENT DOCUMENTS

| | | | |
|---|---|---|---|
| 3,558,972 A | 1/1971 | Arai | 315/77 |
| 3,671,955 A | 6/1972 | Malekzadeh | 340/251 |
| 3,673,456 A | 6/1972 | Sonius | 315/65 |
| 3,876,975 A * | 4/1975 | Sakurai | 340/458 |
| 3,883,777 A | 5/1975 | Morita | 315/88 |
| 4,213,075 A | 7/1980 | Ericson | 315/83 |
| 4,745,339 A | 5/1988 | Izawa et al. | 315/130 |
| 5,680,098 A | 10/1997 | Bejster et al. | 340/458 |
| 5,769,524 A | 6/1998 | Yuan | 362/61 |
| 5,923,125 A * | 7/1999 | Endo | 315/82 |
| 6,281,631 B1 * | 8/2001 | Schaffer et al. | 315/82 |
| 2001/0006468 A1 | 7/2001 | Hamm | 362/525 |

* cited by examiner

*Primary Examiner*—Tuyet T. Vo
(74) *Attorney, Agent, or Firm*—Harleston Law Firm; Kathleen M. Harleston

(57) ABSTRACT

A secondary headlight system for detecting and compensating for failure of an automotive vehicle's low beam headlight, includes:
(a) at least one photoresistor;
(b) fiberoptics connected to the photoresistor;
(c) at least one potentiometer;
(d) at least one NPN transistor operably connected to the photoresistor and the potentiometer;
(e) at least one switching relay operably connected to the potentiometer and the NPN transistor;
(f) at least one power resistor operably connected to the switching relay; and
(g) an automatic reset subsystem comprising at least one capacitor and at least one light emitting diode, the light emitting diode being operably connected to the capacitor and the transistor;
wherein the secondary headlight system is connected to a power supply of the vehicle, and a low beam headlight of the vehicle, the failure of which is to be detected and compensated for; and wherein when the low beam headlight of the vehicle fails, the secondary headlight system is automatically activated, resulting in illumination of a high beam headlight of the vehicle. A method is also included herein.

20 Claims, 9 Drawing Sheets

SECONDARY VEHICLE HEADLIGHT SYSTEM

BACKGROUND OF THE INVENTION

1. Technical Field

This invention relates to a system and method for automatically detecting and compensating for the failure of an automobile's low beam headlight, and more particularly to an electrical system which utilizes an automobile's low beam lamp mechanism to compensate for headlight failure.

2. Background Information

Blown-out car headlights at night are a potential safety hazard for the car's occupants, as well as for others on the road, and can subject the vehicle's driver to a traffic ticket. There are apparently no readily available remedies or substitutes for a malfunctioning vehicle headlight. The driver usually just keeps driving until the next available service station with a mechanic on duty. Most service stations do not have a mechanic on duty until working hours the next day, which means the vehicle is without a headlight until then. In fact, many owners continue to drive their vehicle for months with a blown headlight. These occasionally serve to amuse children traveling in other nearby vehicles counting "pedittles" or "cyclops".

The system of the present invention provides a temporary substitute for a malfunctioning vehicle headlight. When a vehicle's low beam headlight fails, this system will automatically energize the adjacent high beam headlight at the same light intensity as the vehicle's low beam headlight. For example, if the left side, low beam headlight malfunctions, the left side, high beam headlight bulb is automatically energized at normal low beam intensity. When this occurs, no noticeable difference in headlight intensity or appearance will be noted by either the vehicle's occupants, or the occupants of other vehicles in the vicinity. A dashboard indicator warning light can be included in the system to notify the driver of any such failure. This intelligent secondary headlight system is insertable in the circuits of previously manufactured automobiles as an add-on feature, or it can be included during the automobile manufacturing process. This secondary headlight system does not require the addition of any bulbs.

BRIEF SUMMARY OF THE INVENTION

The present invention is a secondary headlight system for detecting and compensating for failure of an automotive vehicle's low beam headlight, including:

(a) at least one photoresistor;
(b) fiberoptics connected to the photoresistor;
(c) at least one potentiometer;
(d) at least one NPN transistor operably connected to the photoresistor and the potentiometer;
(e) at least one switching relay operably connected to the potentiometer and the NPN transistor;
(f) at least one power resistor operably connected to the switching relay; and
(g) an automatic reset subsystem comprising at least one capacitor and at least one light emitting diode, the light emitting diode being operably connected to the capacitor and the transistor;

wherein the secondary headlight system is connected to a power supply of the vehicle, and a low beam headlight of the vehicle, the failure of which is to be detected and compensated for; and wherein when the low beam headlight of the vehicle fails, the secondary headlight system is automatically activated, resulting in illumination of a high beam headlight of the vehicle.

Also included herein is a method for automatically detecting and compensating for the failure of a vehicle's low beam headlight, comprising the steps of:

(a) when the vehicle's low beam bulb malfunctions, measuring the resulting change in resistance using a photoresistor via a fiberoptic cable;
(b) energizing an NPN transistor connected to the photoresistor, which is connected to a switching relay;
(c) energizing the switching relay, which is connected to the photoresistor;
(d) energizing at least one indicator light in the vehicle interior, the indicator light being connected to the switching relay;
(e) illuminating a high beam of the vehicle at the intensity of the low beam by at least one power resistor.

BRIEF DESCRIPTION OF THE SEVERAL VIEWS OF THE DRAWINGS

A more complete understanding of the invention and its advantages will be apparent from the following detailed description taken in conjunction with the accompanying drawings, wherein examples of the invention are shown, and wherein.

DETAILED DESCRIPTION OF THE INVENTION

Figure 1:
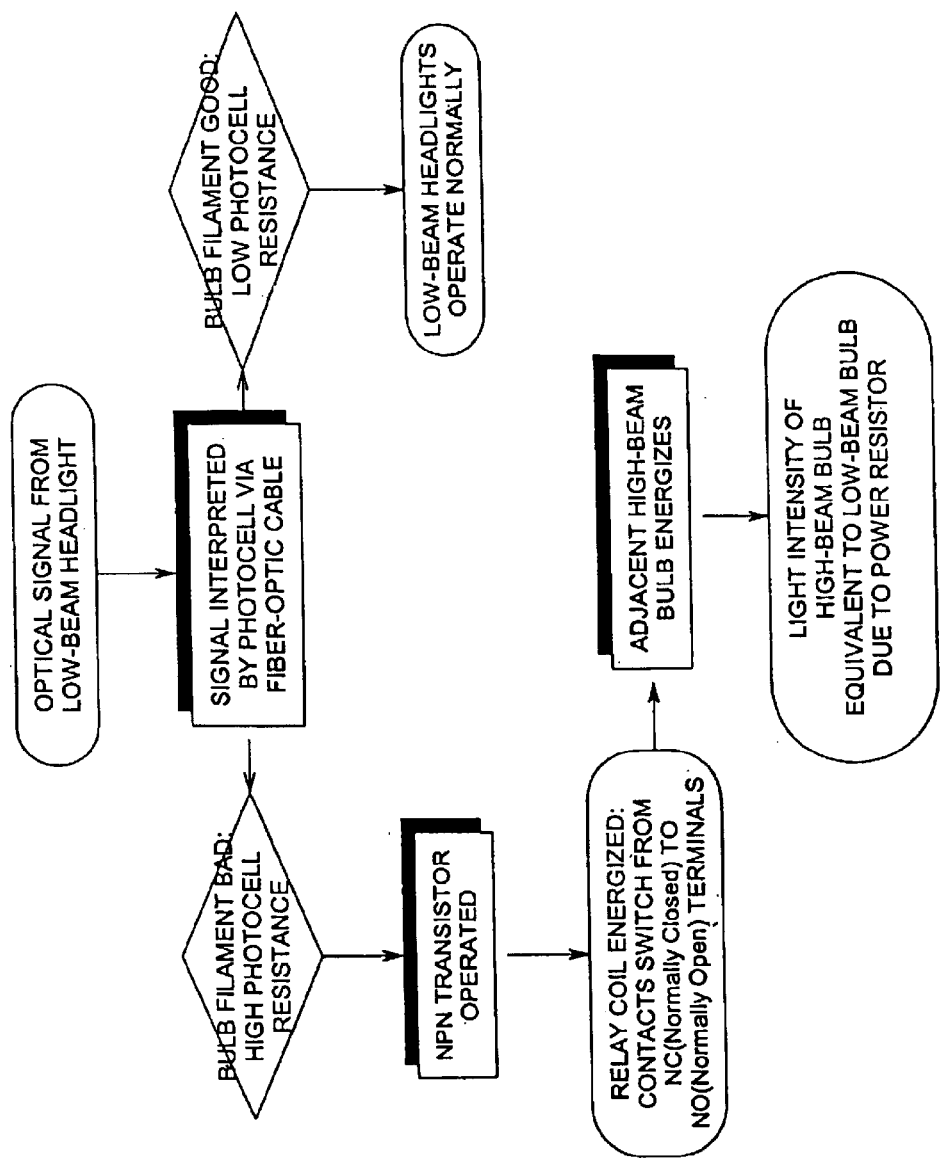
FIG. 1 is a flowchart of a secondary vehicle headlight system according to the present invention.

In the following description, like reference characters designate like or corresponding parts throughout the several views. Also, in the following description, it is to be understood that such terms as "front," "within," and the like are words of convenience and are not to be construed as limiting terms. Referring in more detail to the drawings, the invention will now be described.

Turning first to FIG. 1, a flowchart illustrates a secondary headlight system 10 according to the present invention. This secondary headlight system can be inserted in the electrical circuits of previously manufactured automobiles or similar vehicles as an add-on feature, or it can be incorporated into a vehicle's headlight system during the vehicle's initial manufacturing process. This secondary headlight system 10 does not require the addition of any lamp bulbs.

Figure 2:
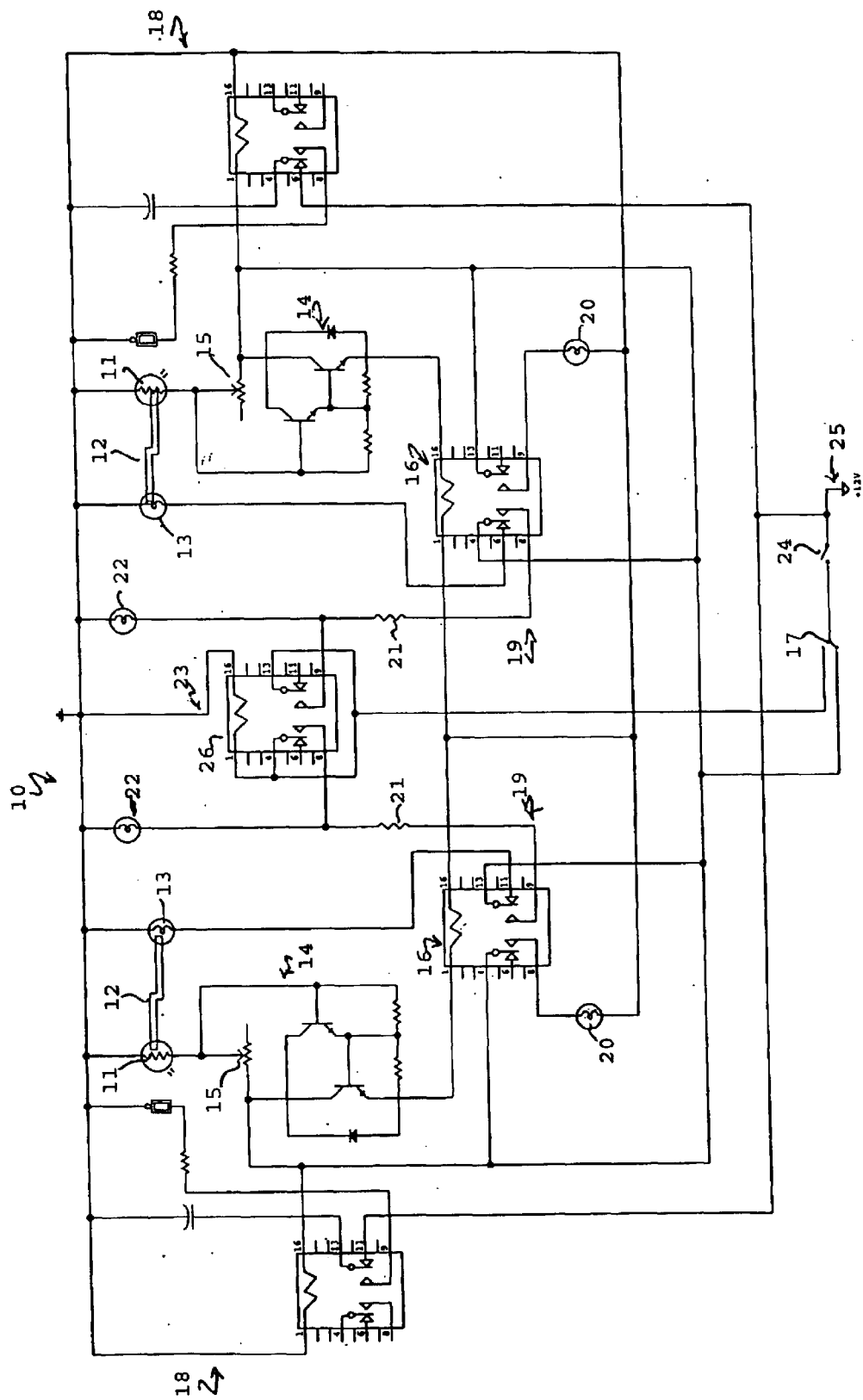
FIG. 2 is a schematic diagram of an electrical circuit employed in a first embodiment according to the present invention.

As shown in FIGS. 1 and 2, the secondary headlight system 10 begins with an optical system from a low-beam headlight. The system 10 includes a photoresistor 11 (photocell) and fiberoptics, which are in a bundled in a fiberoptic cable 12, to the headlight 13. A signal is interpreted by the photoresistor 11 via the fiberoptic cable 12 from the headlight 13. Case 1: If the bulb filament in the headlight has malfunctioned (e.g., headlight is burned out), high photoresistor resistance is generated in the present secondary headlight system 10. Case 2: Alternatively, if the bulb filament is functioning correctly, low photoresistor resistance is generated in the present secondary system. In the latter case, the low-beam headlights continue to operate normally, and the system is in a default-type position and is ready in case a malfunction should occur. In Case 1, the present system is required to compensate for a headlight that is burned out.

First in Case 1, an NPN transistor 14 within the system 10 is energized. The NPN transistor 14 detects whether or not the low beam headlight bulb 13 has malfunctioned. It is believed that the transistor does this by comparing the resistance of the photoresistor to the resistance of a potentiometer 15 within the system 10. In this manner, it will regulate the current that flows through the circuit. One terminal of the transistor 14 is connected to an internal coil of a low beam relay 16, and another to photoresistor 11.

Secondly, as shown in FIG. 1, the low beam relay 16 is energized when the transistor 14 is energized. When the coil of the low beam relay 16 is energized, the contacts associated with the relay switch from normally closed (NC) to normally open (NO) terminals, as shown in FIG. 1. The NC terminal is connected to the primary circuit, which includes a headlight switch 17, low beam headlight bulb 13, transistor 14, and an automatic reset subsystem 18. The NO terminal is connected to a secondary circuit 19, which includes a indicator light 20, a power resistor 21, and a high beam headlight bulb 22. These are shown in the electrical circuit diagrammed in FIG. 2.

Thirdly, the high beam headlight bulb 22 energizes, as shown in FIG. 1. In most four bulb vehicle designs, the high beam bulb is adjacent to the low-beam bulb 13.

Lastly, as shown in FIG. 1, a power resistor 21 in the system 10 absorbs power that would normally be sent to the high beam bulb, if the vehicle's headlight system was functioning properly. This decreases the nominal intensity of the high beam bulb to a level that is equivalent to the low-beam bulb's intensity.

The secondary headlight system 10 is intelligent in that it is fully independent, and does not require that decisions be made by the user of the vehicle in order to operate. The components and arrangement of the system 10, including fiberoptics 12, photoresistor 11, LED 29, low beam headlight bulb 13, and NPN transistor 14, and transmission of signals by/through these system components, allow this independence.

Continuing to refer to FIG. 2, the four bulb-single filament headlight system 10 is comprised of two halves, each of which is a mirror image of the other, except for small differences in potentiometer and photoresistor values. Photoresistor values are ordinarily set by the manufacturer, so the potentiometer 15 accompanying each photoresistor 11 must compensate for these pre-set photoresistor values. This accounts for the differences in potentiometer values. One half of the system 10 (pictured in the right half of FIG. 2) serves the right vehicle headlight, and the other (pictured in the left half of FIG. 2) serves the left headlight. The system 10 is controlled by on-off switch 24, which is connected to a grounded 12 Volt battery 25.

A conventional high beam headlight system 23 is diagrammed at the center of FIG. 2. It includes the high beam bulbs 22, a high beam relay 26, and the headlight switch 17.

Figure 3:
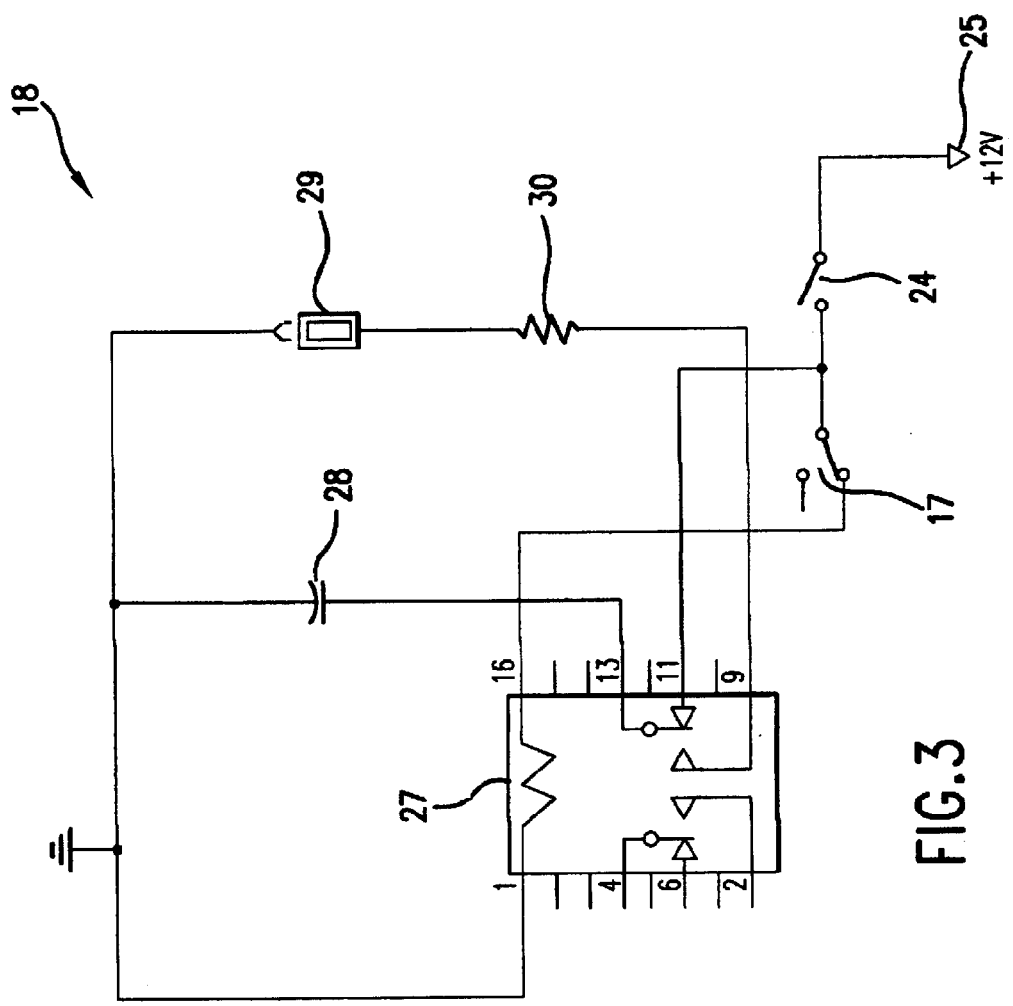
FIG. 3 is a schematic diagram of an electrical circuit for an automatic reset switch as shown in FIG. 2.

FIG. 3 is an expanded schematic view of the automatic reset subsystem 18, which is shown on both sides of FIG. 2, within the secondary headlight system 10. The automatic reset subsystem 18 includes the headlight switch 17, a reset relay 27, a capacitor 28, a light emitting diode 29, and a resistor 30. The reset subsystem 18 automatically resets the low beam relay 16 to its normally closed contact position. This automatic reset subsystem 18 operates in such a way that if the entire headlight system is off, or if the high beam headlight system is activated, reset capacitor 28 would be charged. When the low beam headlight system is activated, NPN transistor 14 is energized due to the photocells' high resistance when the conventional headlight system is off. When the reset relay 27 is energized, the relay's contacts change from normally closed to normally open. This switching effect causes reset capacitor 28 to discharge and illuminate LED (light emitting diode) 29. The automatic reset system 18 is the same on both sides of the secondary headlight system 10. If the driver switches to the vehicle's high beams and then back to low beams, the low beams will illuminate. When the low beam lights are activated, the photocell's resistance is low. Then, when the driver switches to high beam lights, photocell resistance is high. When resistance of the photoresistor 11 is high, the NPN transistor is activated. This causes the coil of low beam relay 16 to be energized, which changes the contacts from normally closed to normally open. This, in turn, activates the secondary headlight system 10. To correct this sequence of events, the LED 29 of the present system 10 sends an optical signal to the photoresistor 11, which changes the photocell's resistance so that the low beam lights operate normally. The automatic reset subsystem 18 of the present secondary headlight system 10 in effect jump starts the low beam headlight system.

Figure 4:
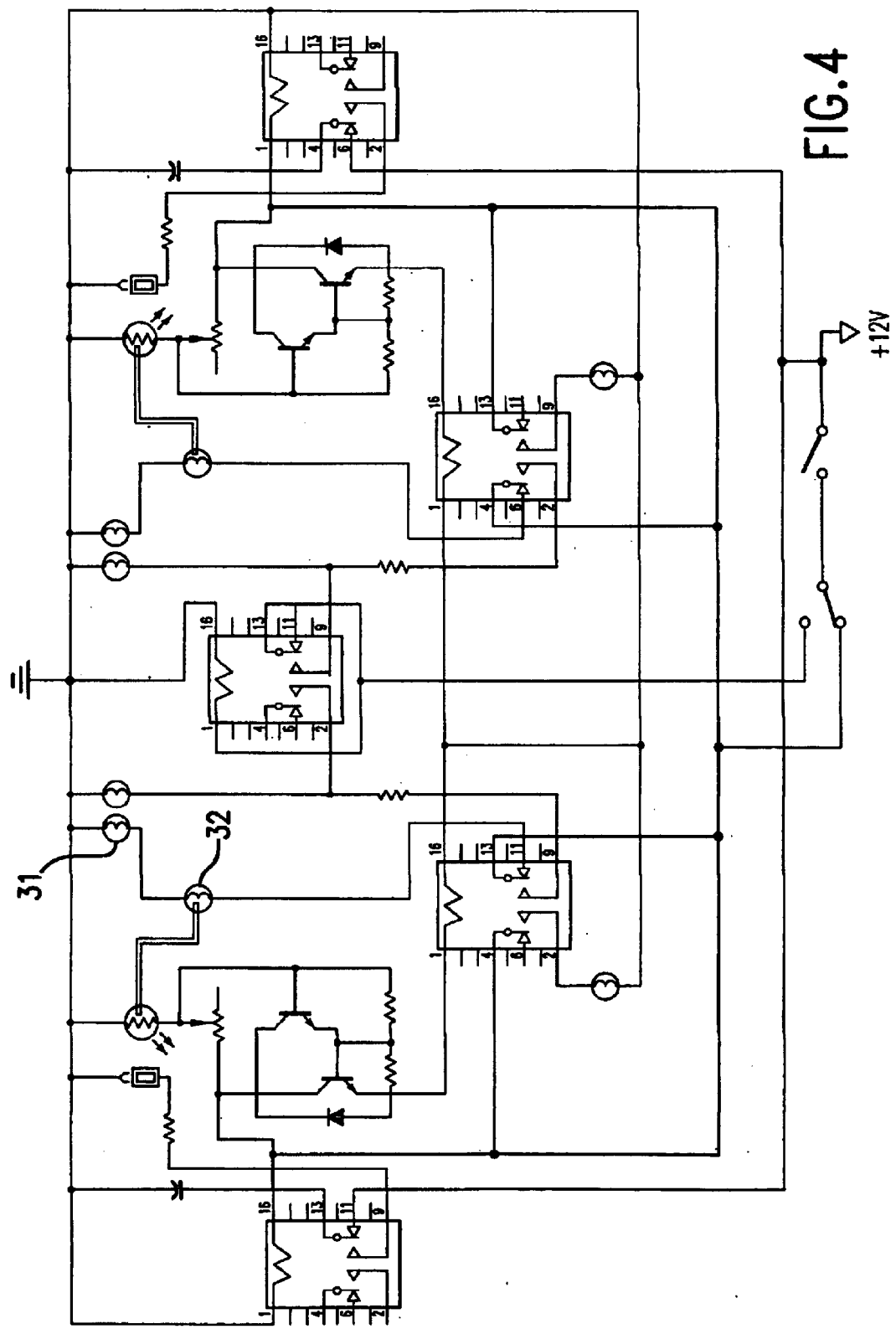
FIG. 4 is a schematic diagram of an electrical circuit employed in a second embodiment according to the present invention.

Referring to FIG. 4, a schematic diagram of an electrical circuit employed in a second embodiment of the secondary headlight system 10: a single bulb-double filament headlight system. This circuit includes a double filament headlight bulb 31, and a second, LED or incandescent bulb 32, which is connected to the photoresistor 11 by the fiberoptic cable 12. If the fiberoptic cable 12 were to be connected directly to the double filament bulb 31, and the low beam filament blows out, the system automatically switches to the secondary system. When the secondary system is activated, the light from the high beam filament, now acting as the low beam filament, will change the resistance of the photoresistor back to its low value. This causes the primary system to become active again. When this switchover occurs, the intelligent secondary headlight system 10 will attempt to operate the primary low beam lighting system. Recognizing that the low beam has malfunctioned, the primary headlight system will switch to the secondary headlight system 10. The lighting system in effect will be jumping back and forth between the primary, conventional headlight system to the secondary headlight system 10.

The present invention allows this problem to be avoided. In the embodiment shown in FIG. 4, low beam indicator bulb 32 for a double filament system is connected to and mimics the low beam filament. When the low beam filament is energized, indicator bulb 32 is also energized. This sends an optical signal to the photoresistor 11, causing its resistance to be low. The primary headlight system then operates normally. If the low beam filament blows out, indicator bulb 32 will not be energized or lit. Because it is intelligent, this event activates the secondary headlight system 10, as described herein.

Figure 5:
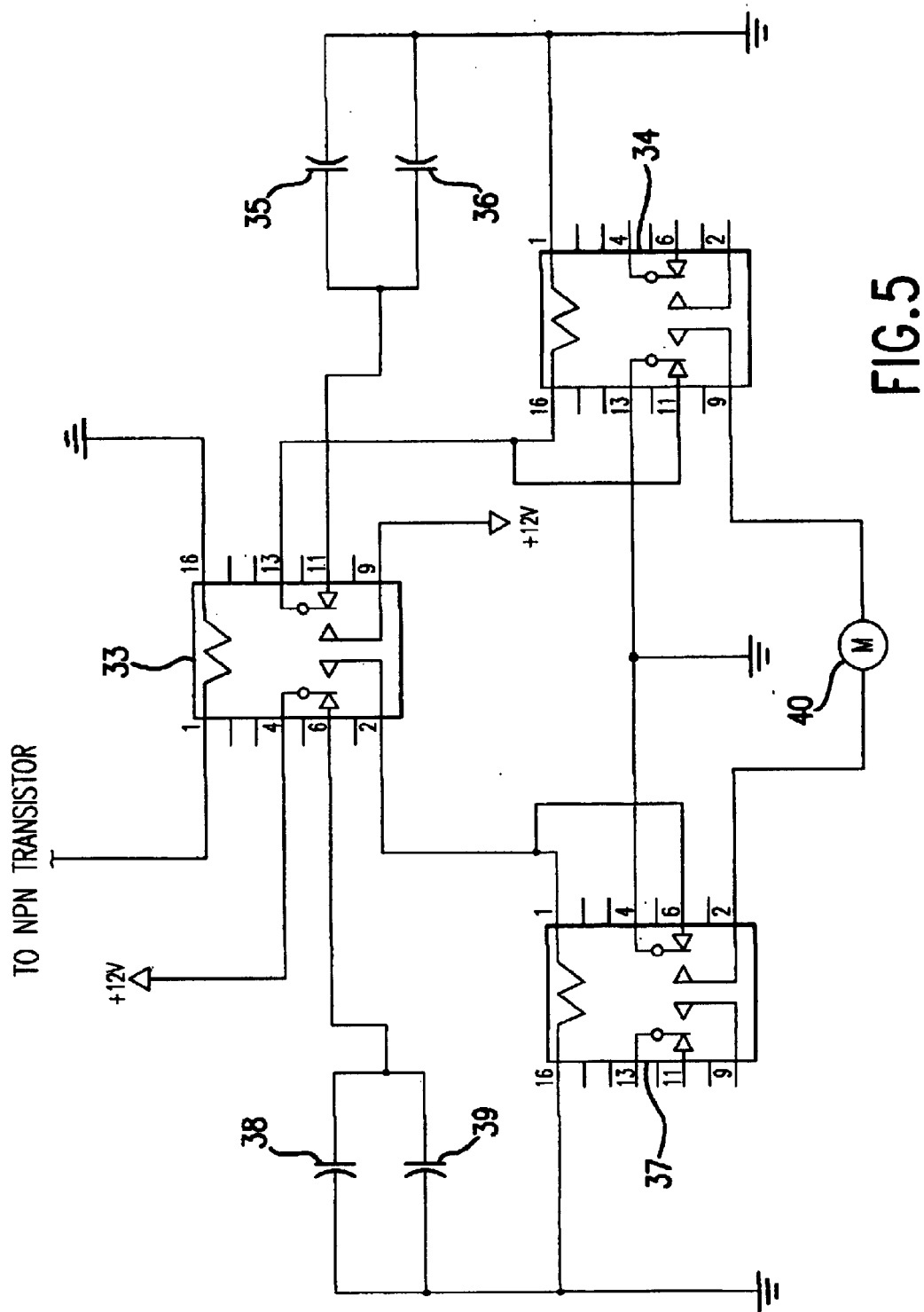
FIG. 5 is a schematic diagram of an electrical circuit according to the present invention.

FIG. 5 is an alternate embodiment of an electrical circuit according to the present invention, shown in repositioning mode. The secondary headlight system 10 includes from about one to about ten, preferably three, high beam mirrors 50 adjacent to the low beam headlight bulb 13, which reflect and direct light from the headlight bulb 13. The circuit shown in FIG. 5 repositions these high beam mirrors to direct rays of light from the high beam headlight bulb 22 along the same path as the low beam headlight 13. At the left and right of the circuit diagram of FIG. 5 are the charging and discharging capacitors 35, 36, 38, 39 for motor 40. When the secondary headlight system 10 is inactive, third and fourth capacitors 38, 39 are charging. When the system 10 is active, first and second capacitors 35, 36 are in a discharging mode. First and second capacitors 35, 36 are used to position the mirrors when the system 10 is inactive. Third and fourth capacitors 38, 39 are used to position the mirrors when the system 10 is active. Capacitor switching relay 33 alternates the capacitors between charging and discharging modes, and motor switching relays 34, 37 change the polarity (direction) of the motor 40. The main power source of the circuit of FIG. 5 comes from the NPN transistor 14. Thus, when NPN transistor 14 is energized, the secondary headlight system 10 is energized.

Figure 6:
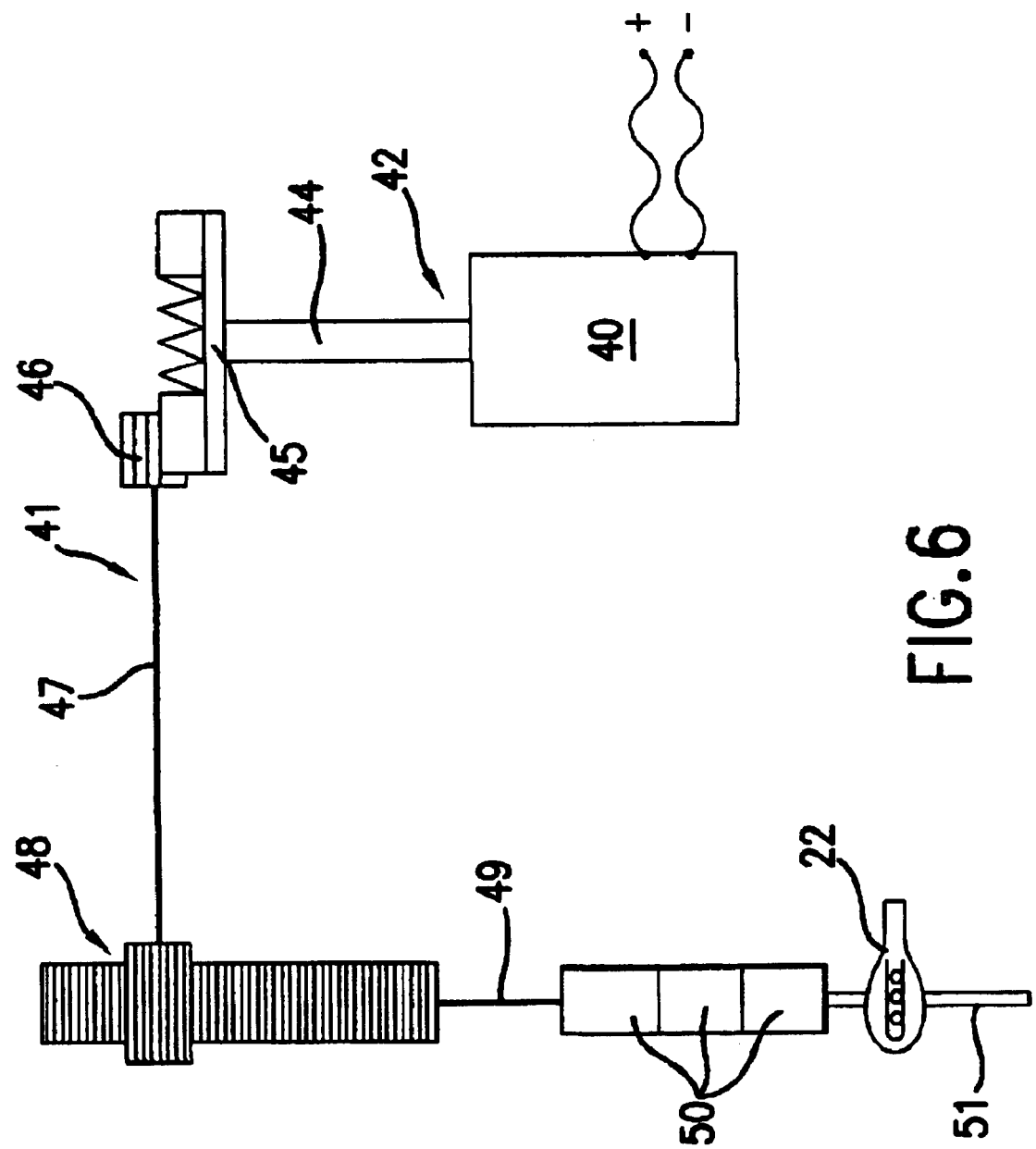
FIG. 6 is a top plan view of a secondary vehicle headlight system according to the present invention.

A preferred embodiment of a light beam redirection subsystem 41 of a secondary vehicle headlight system according to the present invention is shown in FIG. 6. The light beam redirection subsystem 41 requires certain mechanical elements, which are installed within a high beam headlight or adjacent to the high beam headlight. The light beam redirection subsystem 41, as shown from the right side of an automobile in FIG. 6, includes a motor assembly 42, including a motor 40. The motor 40 drives a motor shaft 44. Only a small motor is required, preferably a 12 Volt DC motor. The motor shaft 44 is operably connected to first gear 45, which is movably connected to second gear 46. The second gear 46 is operably connected to one end of a main shaft 47. The opposite end of the main shaft 47 is operably connected to a worm gear assembly 48. At the opposite end of the worm gear assembly 48 is a curved travel track 49. Alternatively, the complementary gears may movably connect to a gear band, which is connected at one end to a recoil spring (not shown). In that case, the gear band travels on the curved travel track 49. A number of mirrors 50, most preferably three or four mirrors, are located side by side along an end portion 51 of the upwardly curved track 49. The mirrors are preferably rectangular or square in shape and identical to one another. Each mirror is larger than the headlight bulb 22 and smaller than a headlight 52. The curved track 49 and mirrors 50 are internal to the left or right high beam headlight, while the remainder of the system 10 is adjacent to the high beam headlight. A vehicle includes one of these secondary systems for each of its two headlights.

Figure 7:
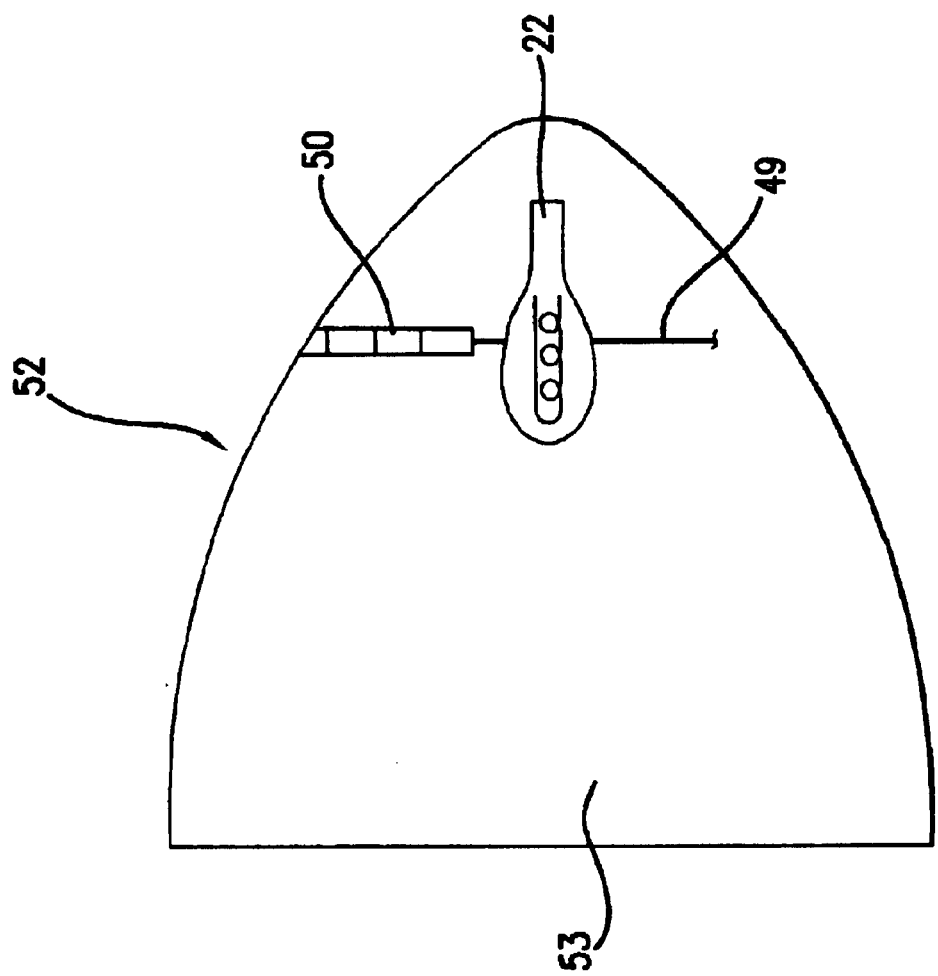
FIG. 7 is a cross-sectional view of a portion of a secondary headlight system according to the present invention.

Referring to FIG. 7, a cross-sectional view from the top of the headlight 52 on the left side of an automobile shows three adjacent, same-sized mirrors 50 adjacent to a high beam headlight bulb 22, with a portion of the curved track 49 shown on an opposite side of the bulb 22. A conventional clear pane 53 covers the front of the headlight.

Figure 8:
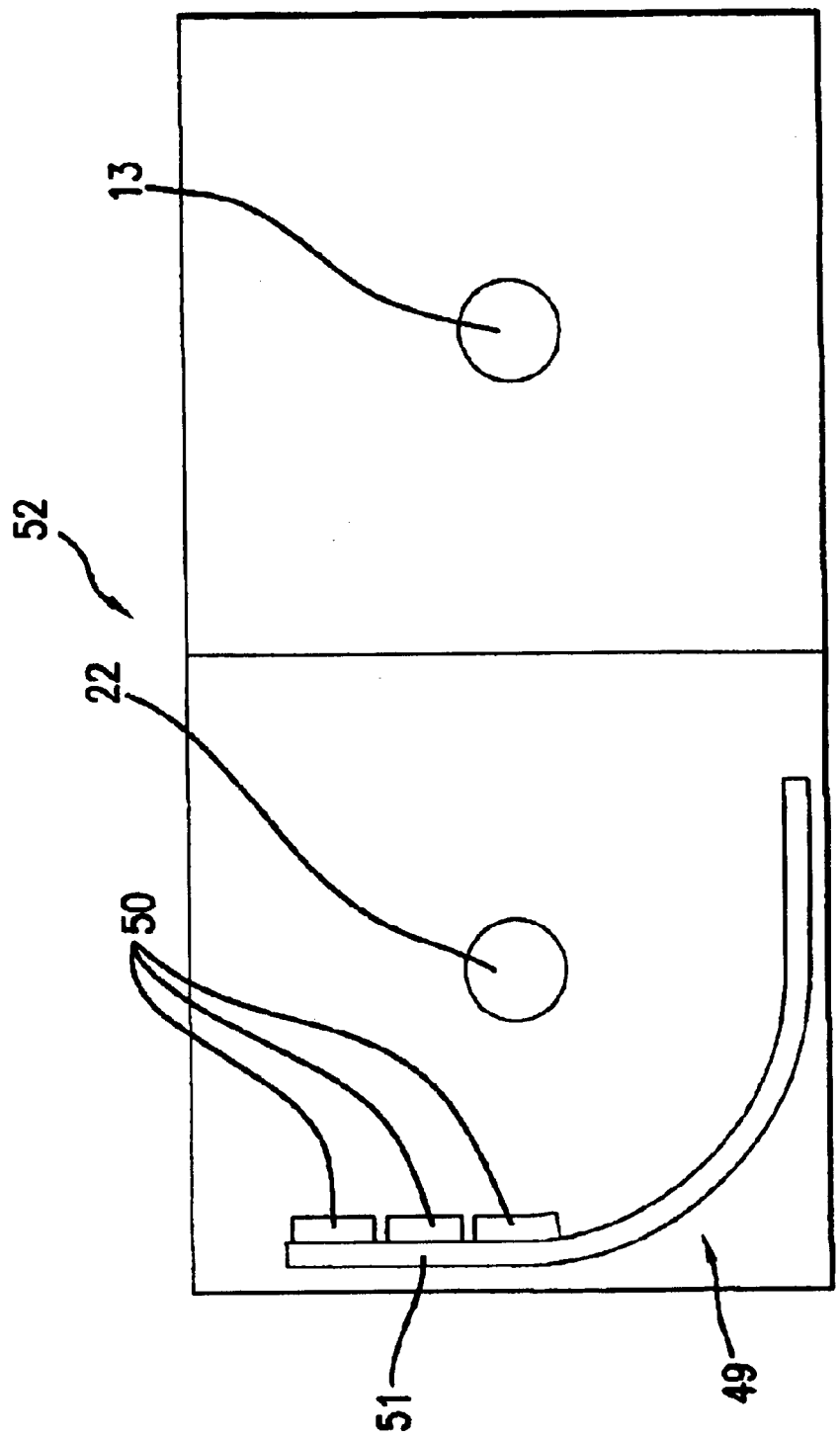
FIG. 8 is a front elevational view of an interior portion of a headlight with a secondary vehicle headlight system according to the present invention.

Turning now to FIG. 8, a headlight 52 on the left side of a vehicle of an automobile is shown from the front. The curved travel track 49 with the movable mirrors 50 is shown to the right of the high beam headlight bulb 22 in FIG. 8. The end portion 51 of the curved track 49 is curved in an upward direction, so that when the secondary system is in use the mirrors 50 reflect light from the high beam headlight bulb 22 to project the beams of light from the bulb 22 slightly to the front and the side of the vehicle along the roadway. For the left headlight 52, the beam of light is projected in front of the headlight and onto the road to the left in front of the vehicle. For a right headlight, the beam of light is projected in front of and onto the road to the front right of the vehicle. The system 10 has two mirror-image halves.

The present secondary headlight system may be implemented automatically upon the system's detection of a bulb filament malfunction, or it can be set up to be manually operated by the driver. In the latter case, the driver would observe a red indicator light or other signal on the dashboard. This would indicate that a headlight on the vehicle has burned out or otherwise malfunctioned. In the less preferred manually operated embodiment of the present system, the driver would then flip a switch on the dash to activate the present system.

At any rate, the preferred embodiment of the present system is a palliative and not a cure. Although it enables the vehicle to be driven safely for a few days, the driver must eventually have the headlight repaired. The present secondary headlight system 10 need not be periodically reinstalled in the vehicle or reactivated with each headlight malfunction. No additional bulbs or complicated headlights are required for use of this system. Standard OEM bulbs are suitable for use herein, which controls costs and keeps the system simple.

An additional, optional feature is adapted for adjusting the aim of the high beam fixture, so that when the secondary headlight system 10 is activated, beams from the headlights will not shine in the direction of opposing vehicles. The setup for the motorized redirection subsystem is related to and incorporated into the secondary headlight system 10. This redirection subsystem operates when the secondary headlight system 10, or the NPN transistor 14 of the secondary system, becomes active. In the event of this subsystem becoming activated, there will be a 12 VDC motor connected to a DPDT relay, with two capacitors and resistors interconnected. The purpose of the motor 40 is to reposition the headlight fixture to another position so that the beam will be focused or readjusted to simulate the function of the primary low-beam headlight.

Continuing with the adjustment feature of the present invention, the energy source for the motor is preferably two capacitors connected to the input terminals of the motor. The purpose of the capacitors is to allow the motor 40 to rotate for a specified distance. If capacitors 35, 36, 38, 39 are not present when the system 10 is in operation, the motor 40 will likely continue to rotate. Capacitors 38, 39 are connected to the positive terminal of the motor. When the primary system is operating properly, these capacitors, 38, 39 are charging. When the secondary system becomes activated, capacitor 38, 39 will begin its discharge phase, causing the motor to become operative. When capacitor 38, 39 is discharging, the duty cycle of the motor will be repositioning the headlight fixture from its high beam position to a position that will be close to the sight path of the low beam. A second capacitor, 35, 36 will reposition the beam from the second duty-cycle to its primary operating position. The charging and discharging phase of both capacitors are opposite to each other. In other words, while capacitors 38, 39 are charging, capacitors 35, 36 are in a discharging phase, and while capacitors 35, 36 are charging, capacitors 38, 39 will be in a discharging phase. A Double-Pole-Double-Throw (DPDT) relay will conduct the switching operation between the charging and discharging phases of the two capacitors.

Figure 9:
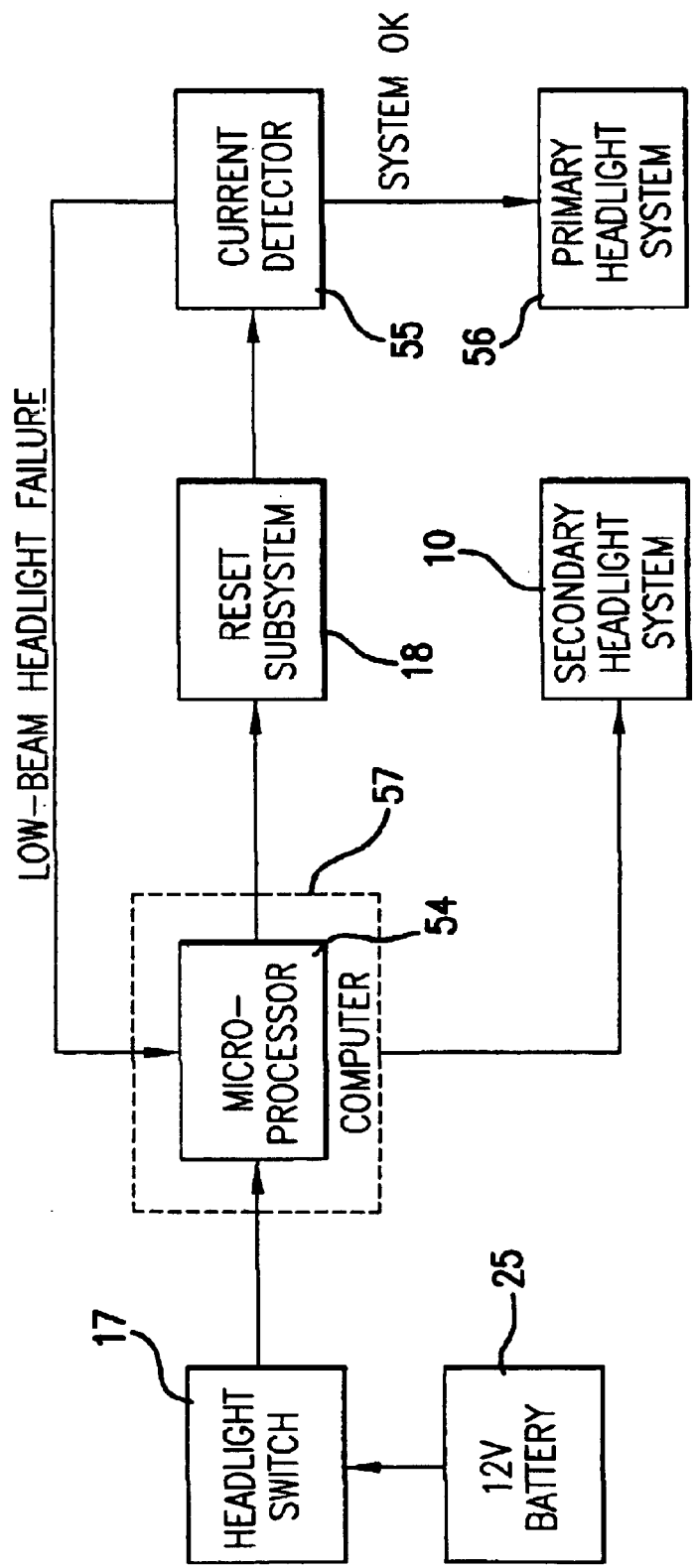
FIG. 9 is a flowchart of a secondary vehicle headlight system according to the present invention.

Also included herein is a secondary headlight system 10 for detecting and compensating for failure of a vehicle's low beam headlight (see FIG. 9) which includes:

(a) a microprocessor 54;

(b) a current detector 55 operably connected to the microprocessor;

(c) a power resistor operably connected to the microprocessor 54, and a high beam headlight of the vehicle; and (d) a reset subsystem 18 between the microprocessor 54 and the current detector 55, the reset subsystem 18 comprising at least one capacitor 28 and at least one light emitting diode 29, the light emitting diode being operably connected to the capacitor 28 and the microprocessor 54;

wherein failure of a primary headlight system 56 of the vehicle activates the secondary headlight system 10, the microprocessor 54 causing a bulb 22 of the high beam headlight to be illuminated. The microprocessor preferably has a built-in memory and is controlled by a computer 57 of the vehicle. The microprocessor 54 switches from circuit to circuit in the system. The power resistor is included in the secondary headlight system 10 to slow down the capacitor discharge. The power resistor absorbs power from the high beam to mimic, or approximate, the intensity of the low beam. The current detector 55 is operably connected between the reset subsystem 18 and the primary headlight system 56 (see FIG. 9), and is comprised of either a double-pole-double-throw (DPDT) relay or a second microprocessor. The current detector 55 receives signals from the reset subsystem 18, and compares input and output signals by way of an energized coil in the DPDT relay, or an analog or digital comparison in the second microprocessor. So, in the event of low beam headlight failure, the microprocessor 54 signals the reset subsystem 18, which signals the current detector 55 to switch to the secondary headlight system 10, which illuminates the high beam headlight 22.

The secondary headlight system preferably further comprises a light beam redirection subsystem, the redirection subsystem comprising a motor assembly, at least two complementary gears, a main shaft, a worm gear assembly, a curved travel track extending adjacent to one of the headlight bulbs, and at least one mirror movably affixed to the curved track; the motor assembly driving the complementary gears, an end one of the gears being operably connected to one end of the main shaft; an opposite end of the main shaft being operably connected to the worm gear assembly; and an opposite end of the worm gear assembly operably connecting to the curved track.

Also included herein is a method for automatically detecting and compensating for the failure of a vehicle's low beam headlight, comprising the steps of:

(a) when the vehicle's low beam bulb malfunctions, measuring the resulting change in resistance using a photoresistor via a fiberoptic cable;

(b) energizing an NPN transistor connected to the photoresistor, which is connected to a switching relay;

(c) energizing the switching relay, which is connected to the photoresistor;

(d) energizing at least one indicator light in the vehicle interior, the indicator light being connected to the switching relay;

(e) illuminating a high beam of the vehicle at the intensity of the low beam by at least one power resistor. The method preferably further comprises a step after step (e) of resetting the low beam headlight bulb after replacing it.

From the foregoing it can be realized that the described device of the present invention may be easily and conveniently utilized for automatically detecting and compensating for failure of an automobile's low beam headlight. It is to be understood that any dimensions given herein are illustrative, and are not meant to be limiting.

While preferred embodiments of the invention have been described using specific terms, this description is for illustrative purposes only. It will be apparent to those of ordinary skill in the art that various modifications, substitutions, omissions, and changes may be made without departing from the spirit or scope of the invention, and that such are intended to be within the scope of the present invention as defined by the following claims. It is intended that the doctrine of equivalents be relied upon to determine the fair scope of these claims in connection with any other person's product which fall outside the literal wording of these claims, but which in reality do not materially depart from this invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

BRIEF LIST OF REFERENCE NUMBERS USED IN THE DRAWINGS

10 secondary headlight system
11 photoresistor
12 fiberoptic cable
13 low beam headlight bulb
14 NPN transistor
15 potentiometer
16 low beam relay
17 headlight switch
18 automatic reset system
19 secondary circuit
20 indicator lamp
21 power resistor
22 high beam headlight bulb
23 high beam headlight system
24 on-off switch
25 12 Volt battery
26 high beam relay
27 reset relay
28 reset capacitor
29 LED
30 resistor
31 double filament headlight bulb
32 low beam bulb
33 capacitor switching relay
34 motor switching relay 1
35 first capacitor
36 second capacitor
37 motor switching relay 2
38 third capacitor
39 fourth capacitor
40 motor 41 subsystem
42 motor assembly
44 motor shaft
45 first gear of alternate embodiment
46 second gear of alternate embodiment
47 main shaft
48 worm gear assembly
49 curved track
50 mirror
51 end portion of track
52 left side headlight system
53 headlight pane
54 microprocessor
55 current detector
56 reset subsystem
57 computer

What is claimed is:

1. A secondary headlight system for detecting and compensating for failure of an automotive vehicle's low beam headlight, the system comprising:
   (a) at least one photoresistor;
   (b) fiberoptics connected to the photoresistor;
   (c) at least one potentiometer;
   (d) at least one NPN transistor operably connected to the photoresistor and the potentiometer;
   (e) at least one switching relay operably connected to the potentiometer and the NPN transistor;
   (f) at least one power resistor operably connected to the switching relay; and
   (g) an automatic reset subsystem comprising at least one capacitor and at least one light emitting diode, the light emitting diode being operably connected to the capacitor and the transistor;
   wherein the secondary headlight system is connected to a power supply of the vehicle, and a low beam headlight of the vehicle, the failure of which is to be detected and compensated for; and wherein when the low beam headlight of the vehicle fails, the secondary headlight system is automatically activated, resulting in illumination of a high beam headlight of the vehicle.

2. The secondary headlight system according to claim 1, further comprising a light beam redirection subsystem, the redirection subsystem comprising a motor assembly, a curved track extending adjacent to one of the headlight bulbs, at least one mirror movably affixed to the curved track, and a means of driving the mirror along the curved track.

3. The secondary headlight system according to claim 2, further comprising a light beam redirection subsystem, the redirection subsystem comprising a motor assembly, at least two complementary gears, a main shaft, a worm gear assembly, a curved travel track extending adjacent to one of the headlight bulbs, and at least one mirror movably affixed to the curved track; the motor assembly driving the complementary gears, an end one of the gears being operably connected to one end of the main shaft; an opposite end of the main shaft being operably connected to the worm gear assembly; and an opposite end of the worm gear assembly operably connecting to the curved track.

4. The secondary headlight system according to claim 1, wherein the fiberoptics are bundled in at least one fiberoptic cable.

5. The secondary headlight system according to claim 4, wherein the secondary headlight system is connected between two of the vehicle's low beam bulbs, two of the vehicle's high beam bulbs, and the vehicle's headlight switch.

6. The secondary headlight system according to claim 4, comprising two mirror image halves; each half being operably connected to one of the vehicle's two headlights; each half comprising one each of the following components: photoresistor, fiberoptic cable, potentiometer, NPN transistor, switching relay, and resistor.

7. The secondary headlight system according to claim 6, wherein the automatic reset subsystem further comprises at least one series resistor.

8. The secondary headlight system according to claim 4, wherein the photoresistor and the transistor are combined in a phototransistor.

9. The secondary headlight system according to claim 8, further comprising a light beam redirection subsystem, the redirection subsystem comprising a motor assembly, at least two complementary gears, a main shaft, a worm gear assembly, a curved travel track extending adjacent to one of the headlight bulbs, and at least one mirror movably affixed to the curved track; the motor assembly driving the complementary gears, an end one of the gears being operably connected to one end of the main shaft; an opposite end of the main shaft being operably connected to the worm gear assembly; and an opposite end of the worm gear assembly operably connecting to the curved track.

10. The secondary headlight system according to claim 9, wherein three of the mirrors are square in shape and are movably affixed side by side along an end portion of the upwardly curved track.

11. The secondary headlight system according to claim 10, wherein the motor assembly comprises a motor-driven drive shaft, one end of the motor shaft being operably connected to a motor of the motor assembly, an opposite end of the motor shaft being operably connected to a first one of the gears; the first gear being movably connected to a second one of the gears; the second gear being operably connected to one end of the main shaft.

12. The secondary headlight system according to claim 11, wherein the curved track and mirrors are internal to a high beam headlight, while the motor assembly, first and second complementary gears, main shaft, and worm gear assembly are adjacent to the high beam headlight.

13. A secondary headlight system for detecting and compensating for failure of a vehicle's low beam headlight, the system comprising:
   (a) a microprocessor;
   (b) a current detector operably connected to the microprocessor;
   (c) a power resistor operably connected to the microprocessor, and a high beam headlight of the vehicle; and
   (d) a reset subsystem between the microprocessor and the current detector; the current detector being operably connected to the reset subsystem and a primary headlight system of the vehicle;
   wherein, in the event of the failure of the low beam headlight, the microprocessor signals the reset subsystem, the reset subsystem signals the current detector to switch to the secondary headlight system, and the secondary headlight system illuminates the high beam headlight.

14. The secondary headlight system according to claim 13, wherein the reset subsystem comprises at least one capacitor and at least one light emitting diode, the light emitting diode being operably connected to the capacitor and the microprocessor.

15. The secondary headlight system according to claim 13, wherein the current detector is comprised of a double-pole-double-throw relay.

16. The secondary headlight system according to claim 13, wherein the microprocessor comprises a built-in memory and is controlled by a computer of the vehicle.

17. The secondary headlight system according to claim 16, wherein the current detector is comprised of a second microprocessor.

18. The secondary headlight system according to claim 16, wherein the power resistor absorbs power from the high beam headlight to approximate the intensity of a low beam headlight.

19. A method for automatically detecting and compensating for the failure of a vehicle's low beam headlight, the method comprising the steps of:

(a) when the vehicle's low beam bulb malfunctions, measuring the resulting change in resistance using a photoresistor via a fiberoptic cable;

(b) energizing an NPN transistor connected to the photoresistor, which is connected to a switching relay;

(c) energizing the switching relay, which is connected to the photoresistor;

(d) energizing at least one indicator light in the vehicle interior, the indicator light being connected to the switching relay;

(e) illuminating a high beam of the vehicle at the intensity of the low beam by at least one power resistor.

20. The method according to claim 19, further comprising a step after step (e) of resetting the low beam headlight bulb after replacing it.

* * * * *